(12) United States Patent
Stephenson

(10) Patent No.: US 9,851,553 B1
(45) Date of Patent: Dec. 26, 2017

(54) SHUTTER WITH LINEAR ACTUATOR

(71) Applicant: Melles-Griot, Rochester, NY (US)

(72) Inventor: Stanley W. Stephenson, Spencerport, NY (US)

(73) Assignee: Melles Griot, Rochester, NY (US)

( * ) Notice: Subject to any disclaimer, the term of this patent is extended or adjusted under 35 U.S.C. 154(b) by 66 days.

(21) Appl. No.: 15/194,610

(22) Filed: Jun. 28, 2016

(51) Int. Cl.
*G02B 26/02* (2006.01)
*G02B 26/04* (2006.01)
*H01F 7/16* (2006.01)

(52) U.S. Cl.
CPC ........... *G02B 26/04* (2013.01); *H01F 7/1607* (2013.01); *H01F 7/1615* (2013.01)

(58) Field of Classification Search
CPC .................. G03B 11/00; G03B 11/043; G03B 2205/0053; G03B 9/02; G03B 9/06; G03B 9/10; G02B 26/04; H01F 7/1607; H01F 7/1615

USPC ......................................................... 359/230
See application file for complete search history.

(56) References Cited

U.S. PATENT DOCUMENTS

| | | | |
|---|---|---|---|
| 5,019,855 A | 5/1991 | Lam | |
| 6,806,985 B1 | 10/2004 | Devenyi | |
| 8,508,828 B2 | 8/2013 | Durfee | |
| 9,274,329 B2 * | 3/2016 | Stephenson | ............ G02B 5/005 |

* cited by examiner

*Primary Examiner* — Euncha Cherry
(74) *Attorney, Agent, or Firm* — Louis S. Horvath

(57) ABSTRACT

An optical shutter apparatus has a baseplate that defines an aperture in a plane and that has at least first and second tabs that extend outward from the plane. At least a first linear actuator is coupled to the first tab and drives a magnetic shaft between the first and second tabs according to an electrical signal. A shutter blade is coupled to the magnetic shaft and is linearly translatable along a translation path in the direction of the plane between a first and a second position, wherein the shutter blade blocks at least a first portion of the aperture in the first position and unblocks the first portion of the aperture in the second position.

16 Claims, 12 Drawing Sheets

SHUTTER WITH LINEAR ACTUATOR

FIELD OF THE INVENTION

The present invention relates generally to optical shutter apparatus and more particularly relates to optical shutter apparatus with a linear actuator.

BACKGROUND OF THE INVENTION

Optical shutters use an actuator to drive each of one or more radiation-blocking elements or "shutter blades", between a first, closed position that blocks the path of light through at least a portion of an aperture and a second, open position that is spaced apart from the first position and that allows light through the aperture. The light radiation that is directed toward the aperture can generally be any form of electromagnetic radiation, such as ultra-violet, visible or infrared radiation, for example. The aperture can be in a frame or baseplate that is directly or indirectly coupled to the actuator. The frame can additionally support the actuator and can include features that retain the shutter blade or blades and that define the travel path of the shutter blade or blades. The actuator can be electromagnetically activated (an "electromagnetic actuator") so that it responds to an electrical signal to translate the shutter blade or blades between the open and closed positions. Electromagnetic actuators typically used for this purpose include linear solenoids, rotary solenoids, or brushed or brushless commutated motors, for example.

Actuators for optical shutters can support monostable or bistable operation. Monostable shutters have a single stable position to which the actuator returns when power is removed. Bistable actuators are able to remain in the last position held at the time power is removed.

Monostable solenoid actuators have a coil of wire that generates a magnetic field when electrical power is applied. The magnetic field applies a force to pull or rotate a soft magnetic core in a given direction. Monostable actuators with soft magnetic cores typically utilize a spring or other mechanical element to return the core to an original position when power is removed. One disadvantage of monostable actuators for shutter control relates to their behavior upon power loss; these actuators require continuous power to remain in the electrically driven state.

Bistable actuators are stable in the state held when power is removed, whether open or closed. Bistable actuators can be created using geared motor drives that lock in a given position when unpowered. In other embodiments, an over-center spring can be used to create a locking force in either of the open aperture or closed (blocked aperture) positions.

The soft magnetic core of a monostable solenoid can be replaced with a hard magnet that adheres to soft magnetic material in each of its two positions to create a bistable shutter. For example, commonly assigned U.S. Pat. No. 8,508,828 to Durfee describes a magnetic voice-coil actuator that operates a rotary shutter using a pair of supporting permanent magnets.

Conventional rotary shutters are characterized by arrangements of shutter blades and supporting features that can be mechanically complex, sizable, and relatively costly.

Thermal imaging apparatus require periodic calibration in order to provide continuous and trouble-free operation, with shutter arrangements that allow calibration to be easily performed. As these types of systems become smaller, lightweight, and less expensive, there is a corresponding demand for shutter systems that are more compact than conventional shutter apparatus and offer simple operation at low cost.

SUMMARY OF THE INVENTION

It is an object of the present invention to advance the art of optical shutter design. Embodiments of the present invention provide a shutter apparatus that has a bistable linear actuator, with a minimum of components and with a compact footprint.

According to one aspect of the present invention, there is provided an optical shutter apparatus comprising a baseplate that defines an aperture in a plane and that has at least first and second tabs that extend outward from the plane;

at least a first linear actuator that is coupled to the first tab and that drives a first magnetic shaft between the first and second tabs according to an electrical signal; and a first shutter blade that is coupled to the first magnetic shaft and that is linearly translatable, along a translation path in the direction of the plane, between a first and a second position, wherein the first shutter blade blocks at least a first portion of the aperture in the first position and unblocks the first portion of the aperture in the second position.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION OF THE INVENTION

Figure 1:
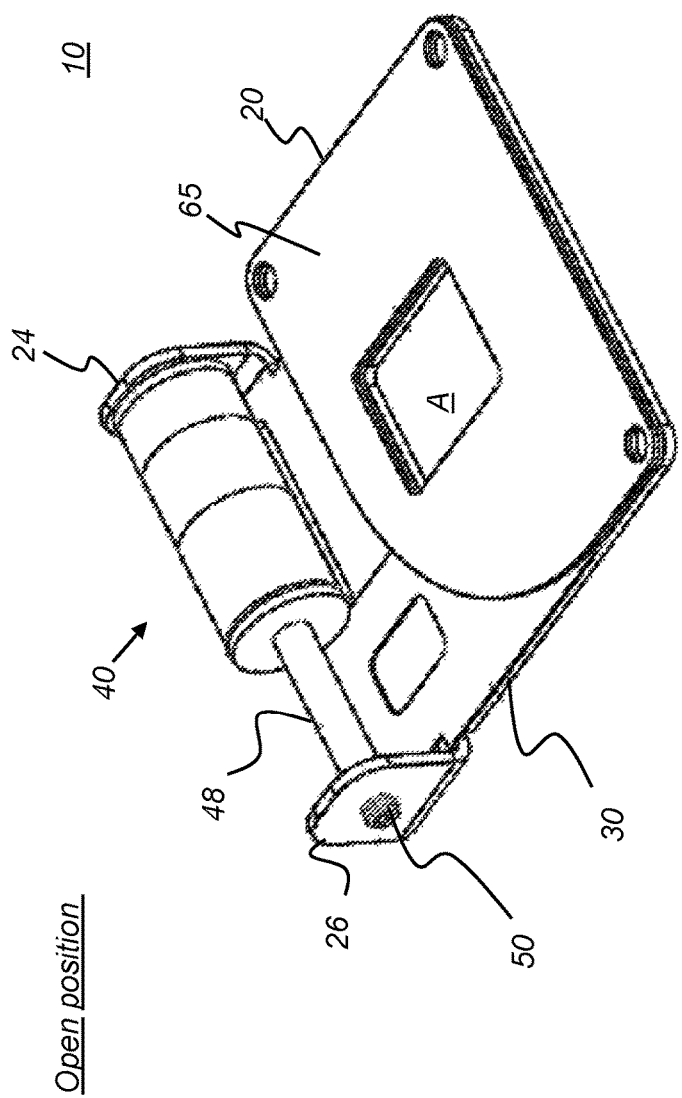
FIG. 1 is a perspective view of a shutter with a linear actuator in an open position.

Figures provided herein are given in order to illustrate principles of operation and component relationships according to the present invention and are not drawn with intent to show actual size or scale. Some exaggeration may be necessary in order to emphasize basic structural or functional relationships or principles of operation. Some conventional components that would be needed for implementation of the described embodiments, such as support components used for providing power, for packaging, and for mounting, for example, are not shown in the drawings in order to simplify description of the invention. In the drawings and text that follow, like components are designated with like reference numerals, and similar descriptions concerning components and arrangement or interaction of components already described may be omitted.

Where they are used, the terms "first", "second", and so on, do not necessarily denote any ordinal or priority relation, but may be used for more clearly distinguishing one element or time interval from another. The term "plurality" means at least two.

In the context of the present disclosure, the term "energizable" describes a component or device that is enabled to perform a function upon receiving power and, optionally, upon also receiving an enabling signal.

In the context of the present disclosure, positional terms such as "top" and "bottom", "upward" and "downward", and similar expressions are used descriptively, to differentiate different surfaces or views of an assembly or structure and physical relationships of components relative to each other and do not describe any necessary orientation of the assembly in an optical apparatus. Two flat surfaces can be considered "substantially orthogonal" where their angle of intersection is within 75-105 degrees. The terminology of a surface lying in a plane has its conventional meaning as understood by those skilled in the mechanical arts and indicates that the surface extends in the direction of the plane.

In the context of the present disclosure, the term "coupled" is intended to indicate a mechanical association, connection, relation, or linking, between two or more components, such that the disposition of one component affects the spatial disposition of a component to which it is coupled. For mechanical coupling, two components need not be in direct contact, but can be linked through one or more intermediary components.

"Non-magnetic materials", in the context of the present disclosure, are materials that are negligibly affected by magnetic fields and that exhibit no perceptible magnetic attraction and are thus not perceptibly pulled toward a magnet. In general, non-magnetic materials have a low relative magnetic permeability, typically not exceeding 1.0 at room temperature. Some exemplary non-magnetic materials include copper, aluminum, certain types of stainless steel, a number of metals and alloys; various ceramics; wood and paper composite materials; glass; plastics and other polymers; fiberglass; and various composite materials such as phenolic materials.

By contrast to non-magnetic materials, "magnetic materials" have higher relative permeability and are considered to be "magnetically responsive" and therefore attracted to a magnet. This can include ferromagnetic materials and various compounds of rare earth materials, for example, that exhibit attraction to a magnet that can be readily perceived without requiring instrumentation.

Soft magnetic materials can carry magnetic field but retain little if any field after conducting a magnetic field and are not used as permanent magnets. Soft materials are readily magnetized and demagnetized. Their capability to respond rapidly in response to magnetic fields is desirable, and makes these materials suitable for use in AC generators and transformers. In general, coercivity (Hc) of a soft magnetic material is no more than 12.5 Oersted (Oe), preferably less than 1.1 Oe. An ideal soft magnetic material has very low coercivity (Hc), generally ranging from about 0.01-0.1 Oersted. Common examples of soft magnetic materials include iron-silicon alloys, nickel-iron alloy, ferritic stainless steels, and pure grades of iron.

Hard magnetic materials, with coercivity (Hc) values well above 100 Oe and typically in thousands of Oersteds, can be permanently magnetized by a strong magnetic field and are used to supply a fixed magnetic field. Common examples of some hard magnetic materials include alloys composed of iron, cobalt, and aluminum, and other rare-earth element materials such as neodymium-iron-boron (NdFeB).

Figure 2:
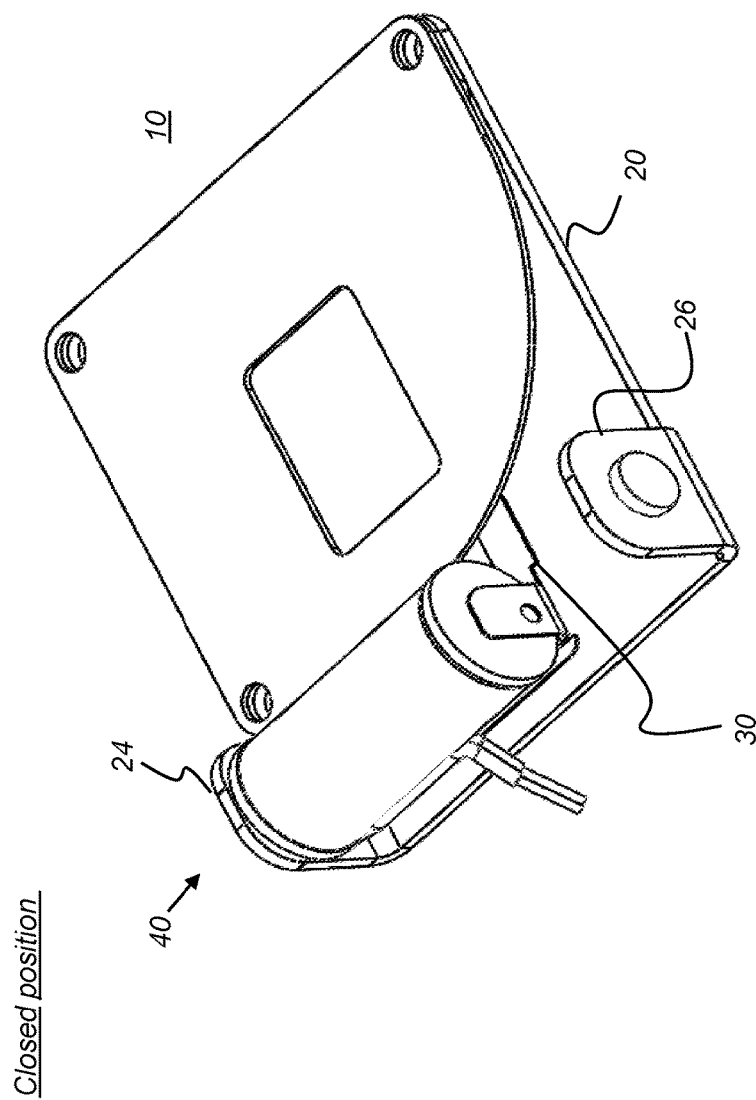
FIG. 2 is a perspective view of a shutter with a linear actuator in a closed position.

FIGS. 1 and 2 are perspective views, from different angles, that show a shutter apparatus 10 for selectively blocking or un-blocking a light energy path according to an embodiment of the present disclosure. FIG. 1 shows shutter apparatus 10 in an open position. A solenoid assembly 40 drives a shutter blade 30 to either of two positions, one closed position for blocking the light energy path, one open or unblocking position. Shutter blade 30 is translated forward, to the left in FIG. 1, allowing light through an aperture A that is defined in a plane by a baseplate 20 and by a top cover 65. FIG. 2 has shutter blade 30 moved in the opposite, blocking or closed direction. Aperture A is blocked or covered (not visible) due to shutter blade 30, which blocks light in the closed position view of FIG. 2.

Referring to FIGS. 1 and 2, planar baseplate 20 of shutter apparatus 10 can be formed from a non-magnetic material, such as a single piece of sheet aluminum, for example. Baseplate 20 has a solenoid tab 24 and an open-position tab 26 that project outward orthogonally from the plane of the baseplate and that define the linear travel limits for solenoid assembly 40 and its coupled shutter blade 30. One or both tabs 24 and 26 can be folded outward (or, if considered with respect to the layout of components of shutter apparatus 10, folded "inward") to project orthogonally relative to the plane of baseplate 20.

Solenoid assembly 40 is a linear actuator that is coupled, along one end, to solenoid tab 24. Solenoid assembly 40 has a magnetic shaft 48 that is coupled to shutter blade 30. Magnetic shaft 48 is a permanent magnet, preferably formed from a hard magnetic material such as neodymium-iron-boron (NdFeB), with a high field strength. Magnets of this type are typically coated with a protective nickel plating.

Blade 30 is formed from a flat sheet of magnetically soft material, such as low-carbon steel or ferritic stainless steel. Blade 30 motion is provided by magnetic shaft 48. Blade 30 includes a blade tab 34 that is magnetically attracted to the end of shaft 48. Magnetic shaft 48 can also be adhesively bonded to shutter blade 30, for example.

To block or unblock aperture A, magnetic shaft 48 is linearly translatable to one of two positions along a planar translation path according to the state of a controlling electrical signal. In a first, unblocked position, solenoid 40 drives magnetic shaft 48 outward to contact open-position tab 26. Tab 26 acts as a detent, limiting linear travel of shaft 48 and temporarily retaining shaft 48 in extended position, using an additional magnetic feature described in more detail subsequently. In this first, open position, shutter blade 30 is driven forward, unblocking aperture A as shown in FIG. 1. In a second, blocked position, solenoid 40 drives magnetic shaft 48 inward along the translation path, according to an alternate state of the controlling electrical signal. Shutter blade 30 is correspondingly driven backward, blocking aperture A as shown in FIG. 2.

It must be noted that, with appropriate changes to the design of shutter blade 30 or position of aperture A, the two corresponding states of the linear actuator, solenoid assembly 40, can be reversed. This reversed arrangement would allow aperture A to be blocked when shaft 48 is extended and unblocked when shaft 48 is retracted.

Figure 3:
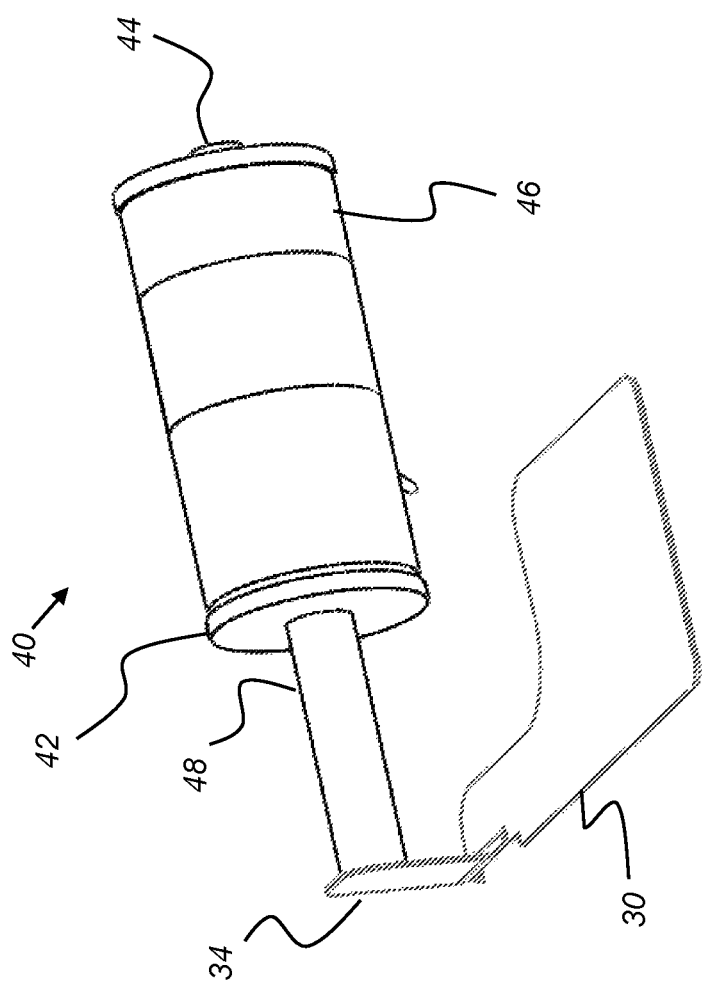
FIG. 3 is a perspective view showing a solenoid assembly coupled to a shutter blade.

FIGS. 3 through 7 show various assembly details for the components and construction of shutter apparatus 10 according to an embodiment of the present disclosure. FIG. 3 shows solenoid assembly 40, separated from its mount to baseplate 20. Solenoid assembly 40 has a spool 42 with an arrangement of internal wire coils 46 energizable to drive shaft 48 to its forward or retracted position according to the state of a received electrical signal 32.

Spool 42 can be formed from a non-magnetic material, such as a polymer or aluminum. Spool 42 is preferably made of material that provides a low-friction, low-wear surface between on the surface facing magnetic shaft 48, such as nylon or acetal Polyoxymethylene (POM). Polymer material can contain one or more low-friction additives or can have a low-friction coating.

Figure 4A:
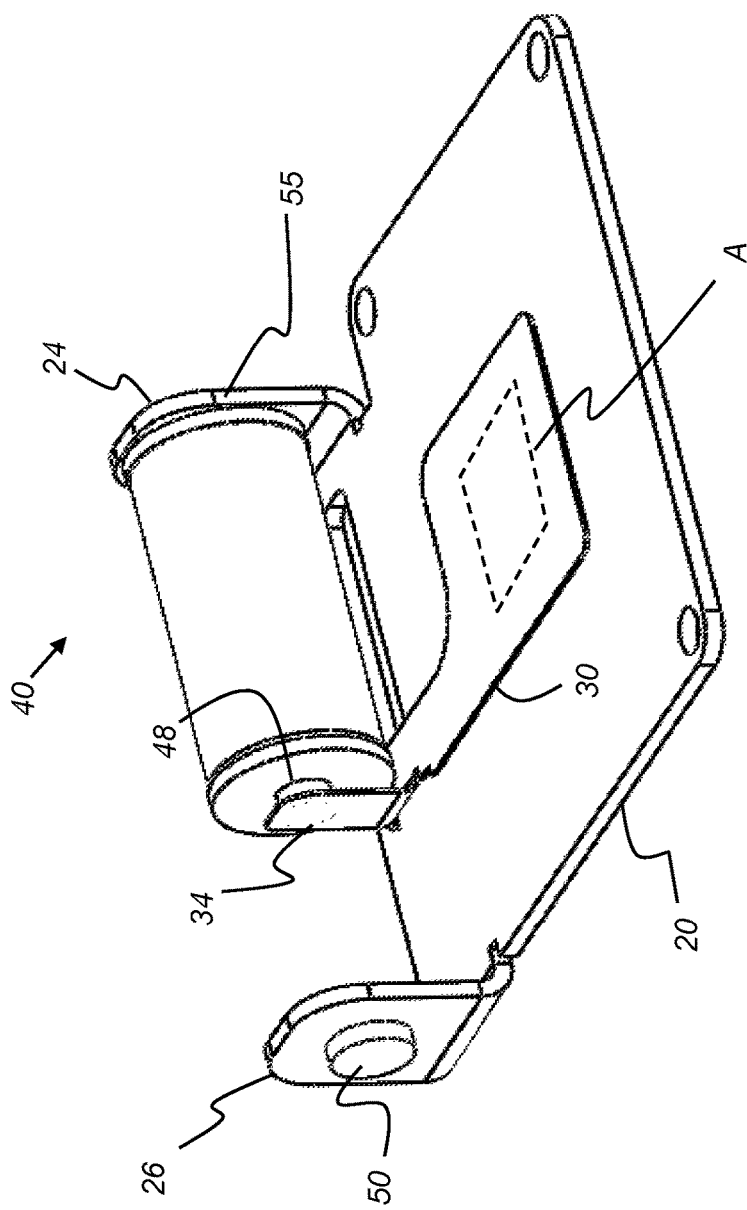
FIG. 4A is a perspective view showing a partial assembly of a shutter apparatus according to an embodiment of the present disclosure.
Figure 4B:
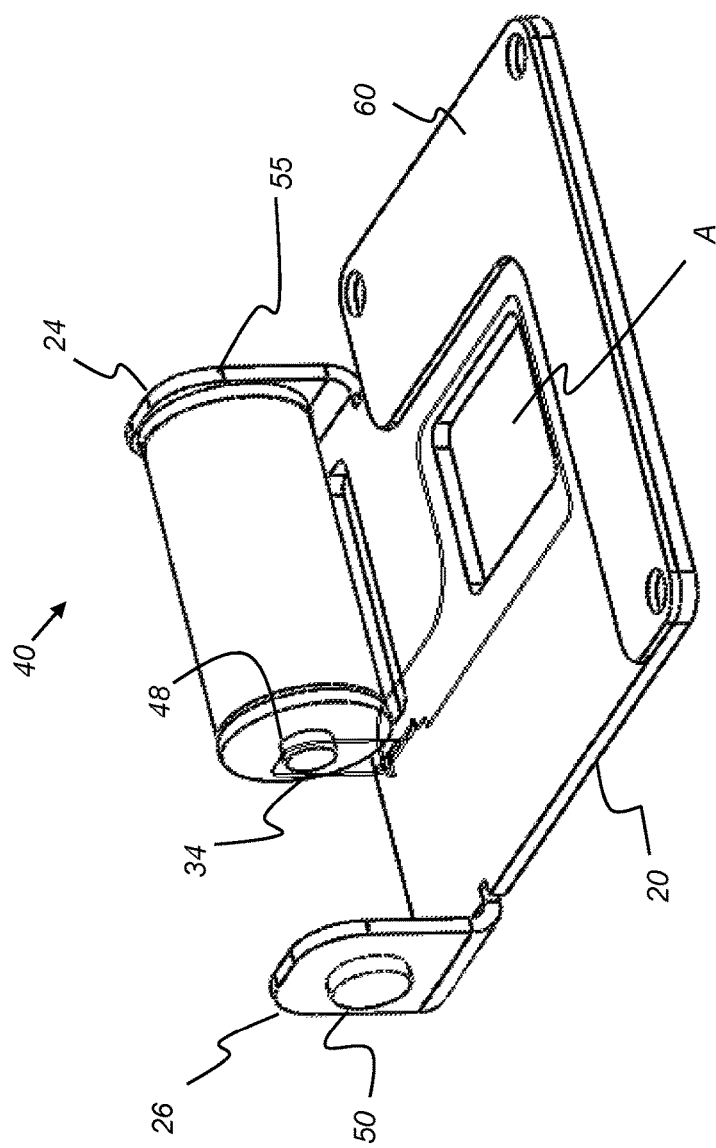
FIG. 4B is a perspective view showing a partial assembly of a shutter apparatus according to an embodiment of the present disclosure, with an added spacer.

FIGS. 4A and 4B are perspective views that show partial assembly of shutter apparatus 10, with solenoid assembly 40 mounted onto baseplate 20 at solenoid tab 24. Shutter blade 30 is shown in the closed position, covering aperture A (traced in outline in FIG. 4A) defined by baseplate 20. Shutter blade 30 has a raised blade tab 34 that is magnetically coupled to shaft 48, as noted previously. Solenoid assembly 40 can be adhesively mounted to solenoid tab 24 or can be press-fitted into its position against solenoid tab 24, such as into a slot or hole formed in solenoid tab 24 for example. By being mounted against solenoid tab 24, solenoid assembly 40 is raised slightly above the plane of baseplate 20, allowing space for a portion of shutter blade 30 to pass beneath solenoid assembly 40, sliding between the solenoid and baseplate 20 in moving between open and closed positions.

In order to provide force for retaining the shaft 48 in open position as shown in FIG. 1, open-position tab 26 is coupled to a magnetic attraction element 50, such as by a clip mechanism or using an adhesive or fastener, for example. Magnetic attraction element 50 is not a magnet but can be, for example, a flat metallic element in the shape of a coin or washer and formed from a soft magnetic material or, alternately, from a hard magnetic material. Correspondingly, a second magnetic attraction element 55 that is coupled to solenoid tab 24 helps to provide a retaining force for holding magnetic shaft 48 in closed position. Magnetic attraction elements 50, 55 can be formed from a soft magnetic material, such as low-carbon steel or ferritic stainless steel. This type of material for elements 50, 55 allows a magnetic field to be induced, generating an attractive force for holding magnetic shaft 48 in position.

A retainer is used to maintain shutter blade 30 along its translation path and to prevent unwanted movement of blade 30 orthogonal to its intended translation path. In the partially assembled configuration of FIG. 4B, a spacer 60 is added, fitted into place against baseplate 20, such as fastened using an adhesive. In the fully assembled shutter apparatus 10 shown in FIGS. 1 and 2, spacer 60 may not be visible, but defines the height of a retaining sleeve or gap between top cover 65 and baseplate 20 through which shutter blade 30 translates, as described in more detail subsequently.

Figure 5:
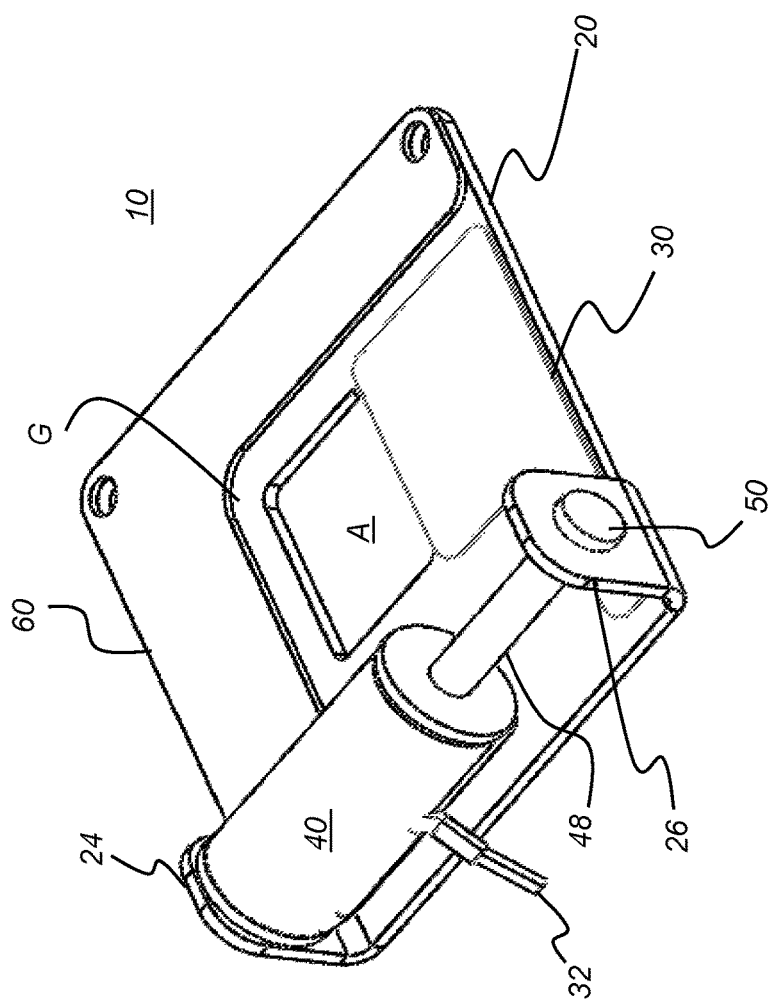
FIG. 5 is a perspective view showing a partial assembly of a shutter apparatus with a spacer and the shutter blade in an open position.

FIG. 5 is a perspective view of partially assembled shutter apparatus 10 that shows solenoid assembly 40 with magnetic shaft 48 in its extended configuration, in contact with open-position tab 26, driving shutter blade 30 to the open, unblocking position.

Figure 6:
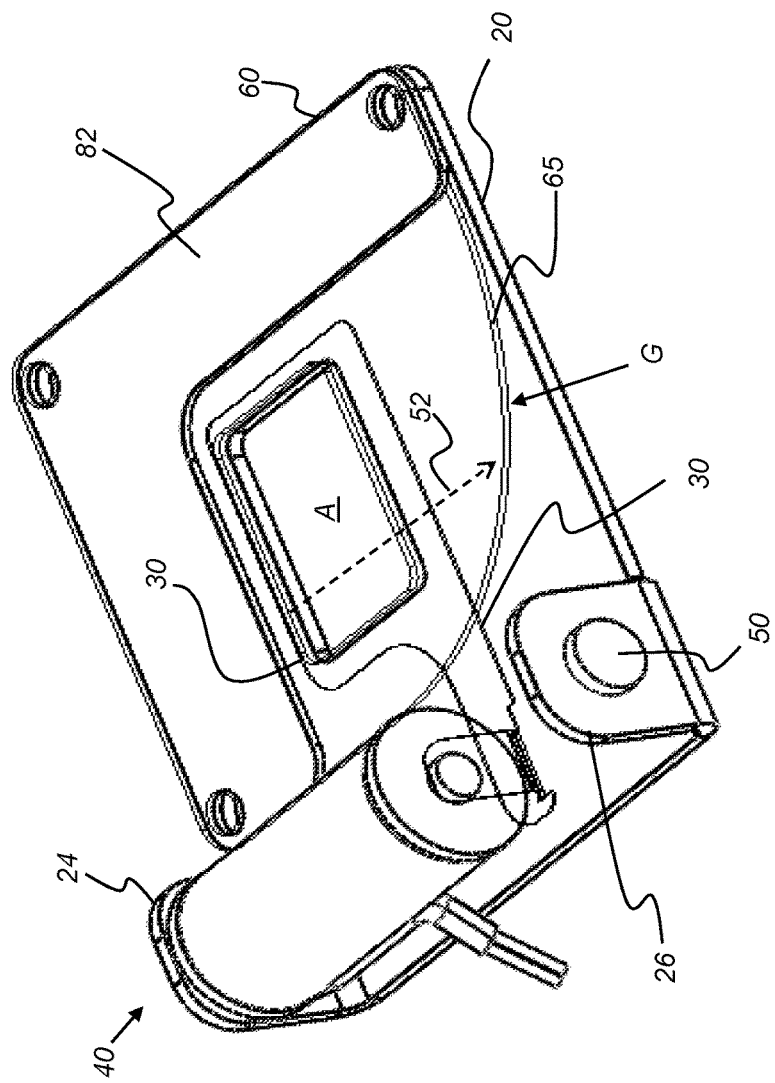
FIG. 6 is a perspective view showing a partial assembly of a shutter apparatus having a top cover or plate.

FIG. 6 shows the position of a flat, apertured top cover 65 that mounts onto spacer 60 and extends around aperture A, acting as a retainer 82 for shutter blade 30 translation. Top cover 65 is formed from a non-magnetic material such as aluminum or a polymer material and is substantially planar. For better visibility of underlying features of shutter apparatus 10, apertured top cover 65 is shown in FIG. 6, but the aperture A would not be visible in the closed view position shown. Top cover 65 can be adhesively coupled to spacer 60 to define, between cover 65 and baseplate 20, a planar translation path 52 for shutter blade 30 travel. Translation path 52 extends in parallel to the surface of baseplate 20, with shutter travel along translation path 52 in the direction of the dashed line as shown. Any of a number of mechanical fasteners such as screws or clips can be used to secure spacer 60 and top cover 65 in position on baseplate 20.

Figure 7:
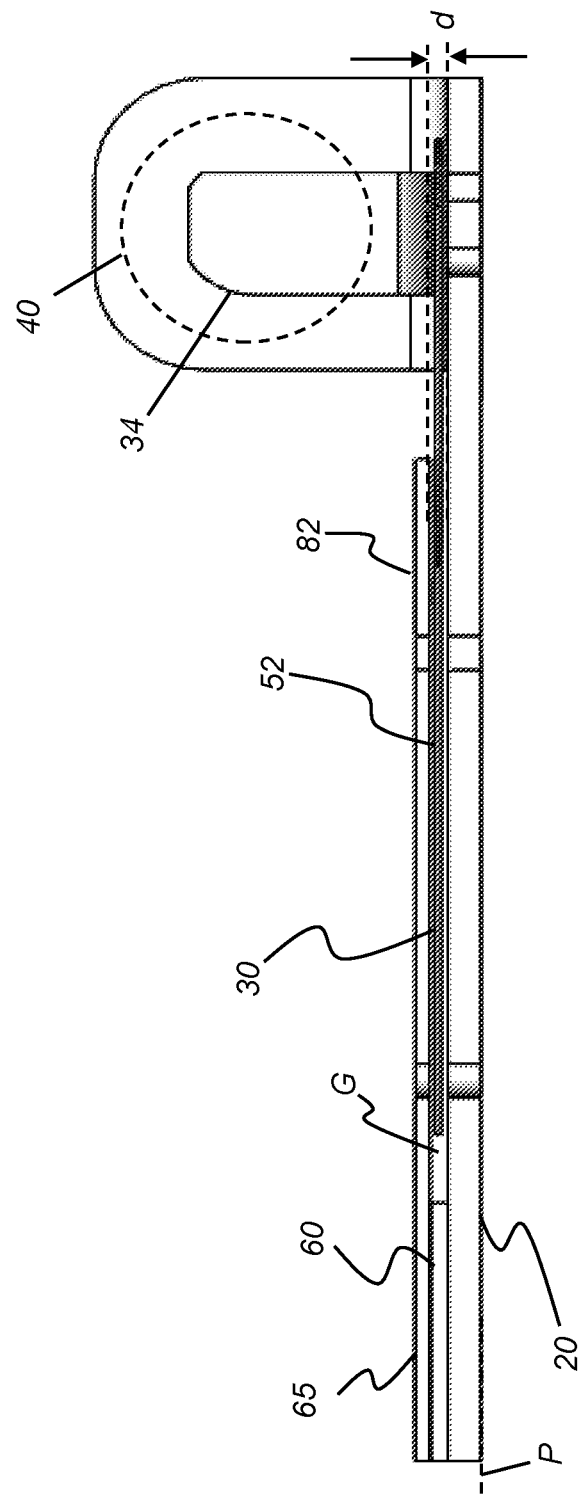
FIG. 7 is a cross-sectional side view that shows how a gap is formed to allow sliding movement of a shutter blade across an aperture area.

The schematic side view of FIG. 7 shows spacer 60 separating the retaining top cover 65 from baseplate 20 by a distance d to form a gap G that extends parallel to the plane P in which baseplate 20 lies. Gap G allows space for sliding translation of shutter blade 30 along a planar translation path 52 that extends across the surface of baseplate 20 and parallel to plane P to block or unblock the aperture. Top cover 65, in defining the translation path 52 over a portion of gap G acts as retainer 82 to help retain shutter blade 30 along its intended translation path 52, so that the blade does not inadvertently move or shift in a direction orthogonal to the translation path 52 and jam or shift out of its intended position.

Figure 8:
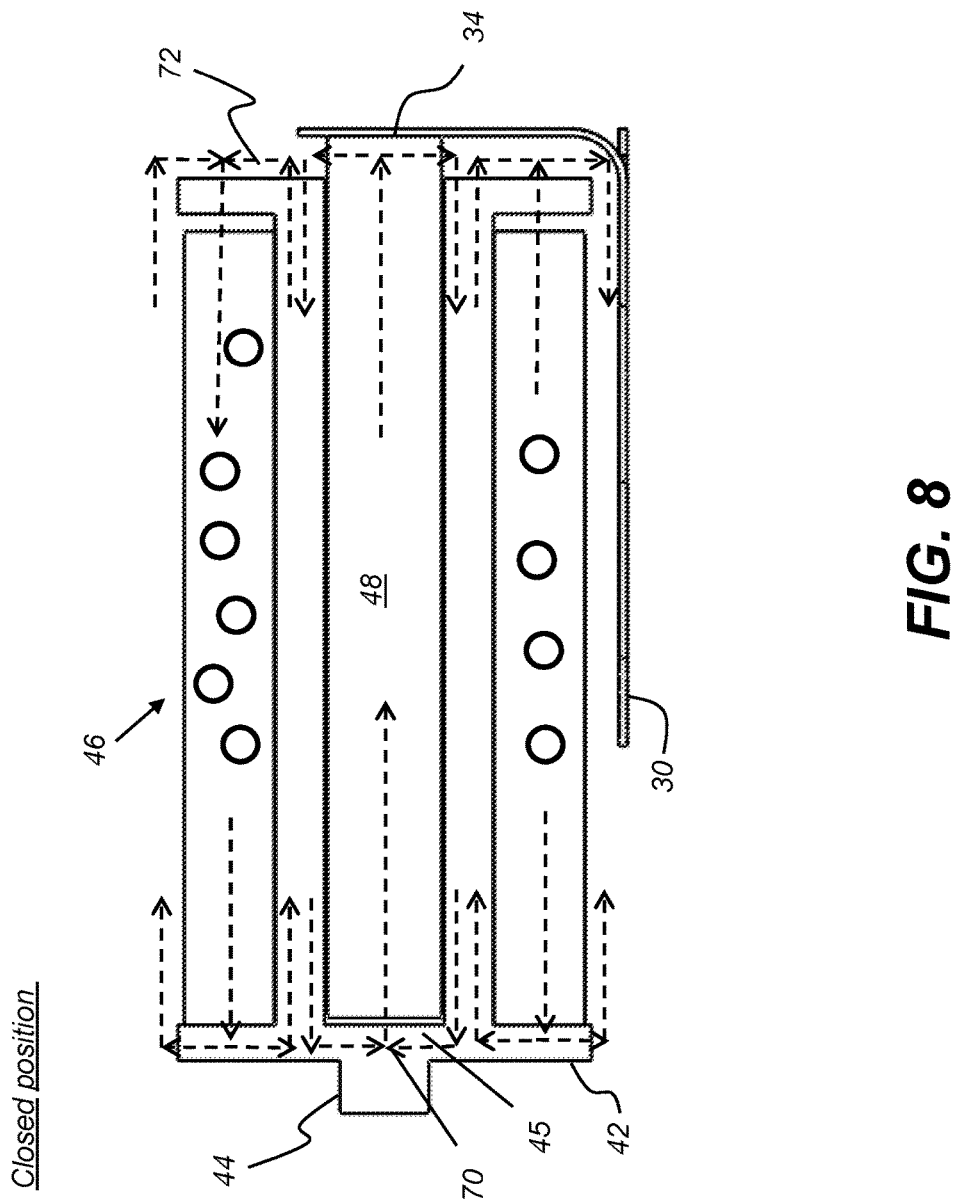
FIG. 8 is a cross-sectional view of a solenoid assembly in an energized state.
Figure 9:
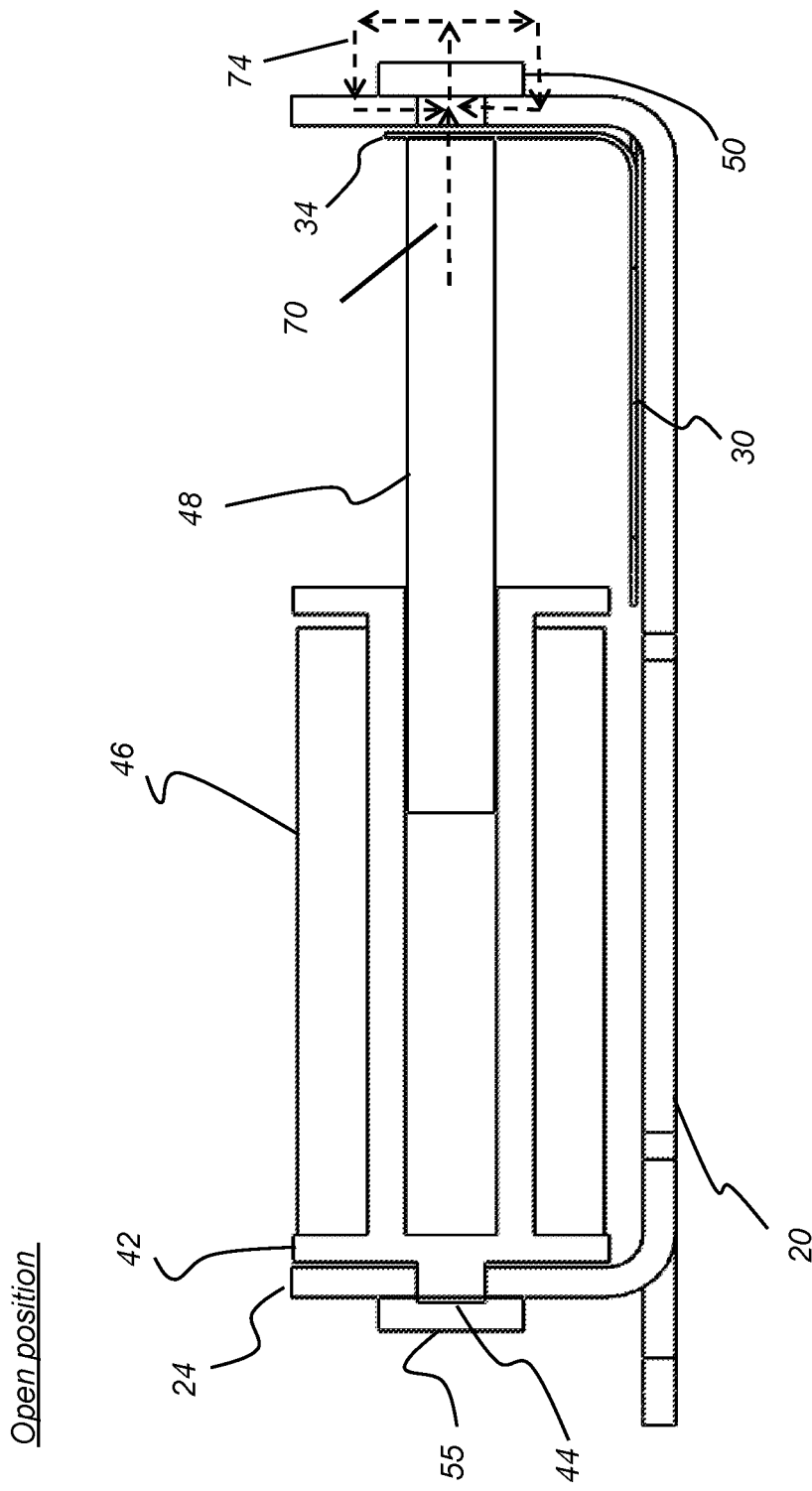
FIG. 9 is a cross-sectional view of a solenoid assembly in a de-energized state that retains the shutter blade.

The schematic side views of FIGS. 8 and 9 show, for closed and open positions, respectively, a cross-section of solenoid assembly 40, showing features of electromagnetic operation of shutter blade 30. Solenoid assembly 40 includes spool 42. To form the solenoid, coils 46 of electrically conductive wire are wound circumferentially around spool 42. For clarity, only a few of the coils 46 are represented, only showing a few representative cross sections in FIG. 8. Coil windings are formed of non-magnetic, electrically conductive material such as copper or aluminum. Spool 40 includes a mounting plug 44 or other feature that can be inserted into or bonded to a corresponding socket or cavity on solenoid tab 24, as described previously with reference to FIG. 4A.

In solenoid operation, coils 46 can have an applied voltage which provides electrical current to generate a coil flux path 72 along the axis of spool 42, as shown in FIG. 8. Magnetic shaft 48 has a magnet flux path 70 relative to coil flux path 72, to axially force magnetic shaft 48 to move in a forward or reversed direction depending on the direction of the current. Interaction between coil flux path 72 and magnet flux path 70 moves magnetic shaft 48 linearly, based on the direction of current through coils 46. With this arrangement, the applied electromagnetic field can drive magnetic shaft 48 into either the closed position of FIG. 8 or the open position of FIG. 9. Magnet flux path 70 of magnet 48 and the coil flux path 72 of coils 46 are shown in an attracting polarity that draws magnetic shaft 48 into solenoid assembly 40. Reversing the current flowing through coils 46 reverses the coil flux path 72 and drives magnetic shaft 48 in the opposite, outward direction.

In FIG. 9, shutter assembly 10 is in the de-energized state. Coils 46 are not carrying current and there is no coil flux path 72. The attraction of magnetic shaft 48 to either of magnetic attraction elements 50 and 55 provides a retention force for magnetic shaft 48 and shutter blade 30. Magnetic attraction elements 50 and 55 can be soft magnetic material such as low carbon steel or ferritic stainless steel that are attached to corresponding non-magnetic tabs 24, 26 that protrude from baseplate 20. Alternately, elements 50 and 55 can be magnets oriented to provide a measure of retention force for shaft 48. When an end of magnetic shaft 48 is adjacent to a magnetic attraction element 50, 55 as shown in FIG. 9, magnetic shaft 48 induces a flux path 74 in the magnetic attraction element, causing force in an attracting direction. The flux path 74 forms a field of attraction between magnetic shaft 48 and the corresponding magnetic attraction element 50, 55. As a result, magnetic attraction between magnetic shaft 48 and either of magnetic attraction elements 50, 55 retains shutter blade 30 in position in the absence of current through coils 46. Magnetic retention of shaft 48 and its coupled shutter blade 30 helps to stabilize and maintain blade 30 position and provides a measure of resistance to disruptive gravitational or shock force.

FIG. 9 also shows mounting plug 44 of spool 42 coupled to baseplate 20 at solenoid tab 24. This arrangement couples at least the end portion of solenoid assembly 40 to baseplate 20. Mounting plug 44 in this case is a single circular extension that fits into a hole in solenoid tab 24. Mounting plug 44 can be glued or heat staked to solenoid tab 24, for example. Mounting plug 44 could alternately include more complex fasteners, such as threaded fasteners, for attachment to solenoid tab 24 or other portion of baseplate 20. Spool 42 has a membrane across the bore, spool stop 45 (FIG. 8) to provide a stop for magnetic shaft 48 when shaft 48 is retracted into solenoid assembly 40.

Figure 10:
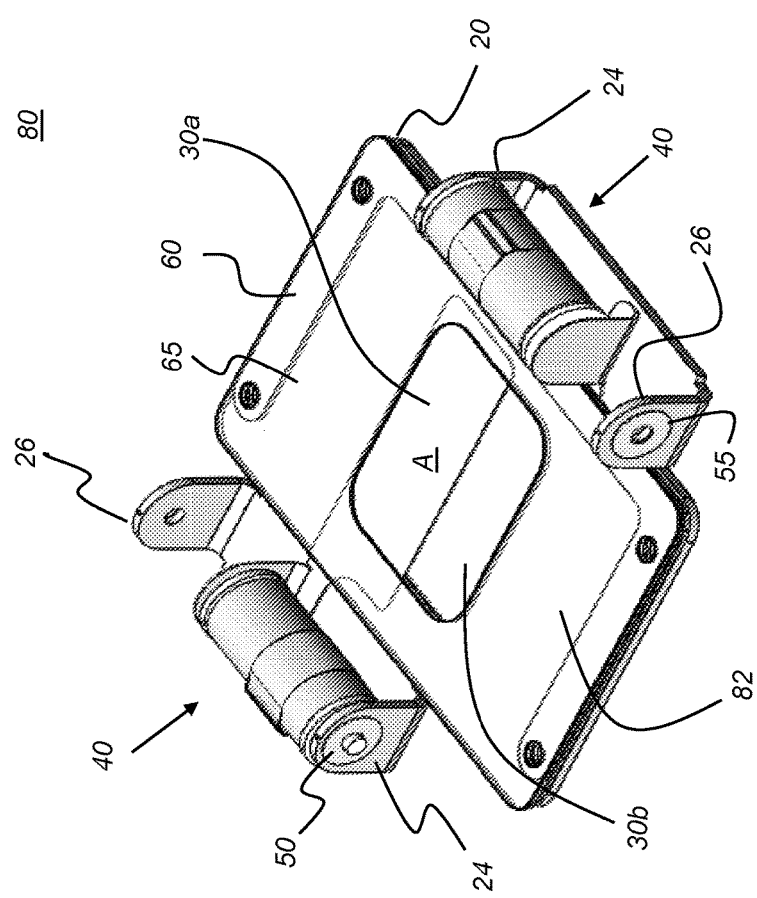
FIG. 10 is a perspective view that shows a shutter apparatus having two solenoid assemblies.

The perspective view of FIG. 10 shows a shutter apparatus 80 having two solenoid assemblies 40, each driving its associated shutter blade 30a, 30b in a respectively opposite direction, so that each shutter blade 30a, 30b blocks or unblocks a portion of aperture A. First shutter blade 30a is traced in outline in FIG. 10, shown in blocking position. To fully block aperture A, an edge of the second shutter blade 30b can butt against or overlap an edge of the first shutter blade 30a. Cover 65 acts as retainer 82 for both shutter blades 30a and 30b.

According to an embodiment of the present disclosure, a linearly translatable shutter uses a single metal sheet to form shutter blade 30 and a blade interface. The blade is magnetically soft for coupling to magnetic shaft 48. A single piece, non-magnetic frame, such as an aluminum frame, forms baseplate 20 that defines an aperture and holds the solenoid assembly between two tabs 24, 26 that define the extent of solenoid shaft travel and stop position. Tabs 24, 26 also support magnetic attraction elements to maintain the shutter blade in either open or closed position. The elements of solenoid assembly 40 are selected to provide sufficient urging force for translating shutter blade 30 along its travel path.

Figure 11:
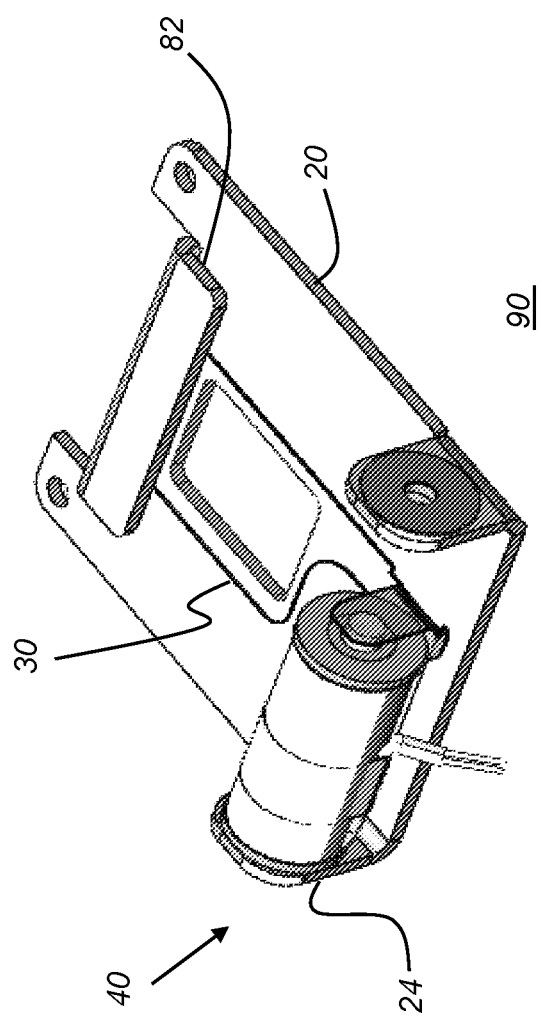
FIG. 11 is a perspective view that shows a shutter apparatus having a retainer formed from a folded back portion of the baseplate material.

The perspective view of FIG. 11 shows a shutter apparatus 90 in closed position, having retainer 82 formed from the baseplate 20 material. This arrangement provides the needed functions of retainer 82 and eliminates the spacer and cover parts described previously, along with needed fasteners or adhesives. To form retainer 82, a portion of baseplate 20, along its edges, is folded back or inward to extend over a nearby edge of the shutter blade 30 and to constrain out-of-plane shutter blade 30 travel.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. An optical shutter apparatus comprising:
   a) a baseplate that defines an aperture in a plane and that has at least first and second tabs that extend outward from the plane;
   b) at least a first linear actuator that is coupled to the first tab and that drives a first magnetic shaft between the first and second tabs according to an electrical signal; and
   c) a first shutter blade that is coupled to the first magnetic shaft and that is linearly translatable, along a translation path in the direction of the plane, between a first and a second position, wherein the first shutter blade blocks at least a first portion of the aperture in the first position and unblocks the first portion of the aperture in the second position.

2. The apparatus of claim 1 wherein the first shutter blade is formed from a magnetic material.

3. The apparatus of claim 1 wherein the baseplate is formed from a non-magnetic material.

4. The apparatus of claim 1 wherein the first linear actuator is a first solenoid.

5. The apparatus of claim 1 wherein a raised tab of the first shutter blade is adhesively bonded to the magnetic shaft.

6. The apparatus of claim 1 further comprising a magnetic attraction element formed from a soft magnetic material, wherein the magnetic attraction element is coupled to the second tab of the baseplate.

7. The apparatus of claim 1 further comprising a magnetic attraction element formed from a hard magnetic material, wherein the magnetic attraction element is coupled to the second tab of the baseplate.

8. The apparatus of claim 1 further comprising a retainer that defines the planar translation path of the first shutter blade.

9. The apparatus of claim 8 wherein the retainer has a planar top cover that is coupled to the baseplate through a spacer, wherein the spacer defines a gap for shutter blade translation, wherein the gap lies between the top cover and the baseplate and extends in parallel to the first plane.

10. The apparatus of claim 8 wherein the retainer is formed by folding a portion of the baseplate inward to extend over the first shutter blade.

11. The apparatus of claim 1 further comprising
   a second linear actuator that is coupled to a third baseplate tab and that is energizable to drive a second magnetic shaft between the third tab and a fourth tab, wherein the third and fourth tabs extend from the baseplate; and
   a second shutter blade that is coupled to the second magnetic shaft and that is linearly translatable across the plane between a third and a fourth position, wherein the second shutter blade blocks at least a second portion of the aperture in the first position and unblocks the second portion of the aperture in the second position.

12. An optical shutter apparatus comprising:
a) a baseplate that defines an aperture in a plane and that has first and second tabs that extend orthogonally outward from the plane;
b) a solenoid that is coupled to a first tab and has a magnetic shaft that is alternately actuable to extend toward, or retract from, the second tab, according to an electrical signal;
c) a shutter blade that is magnetically coupled to the magnetic shaft and that translates between a first position at which the shutter blade blocks at least a first portion of the aperture and a second position at which the shutter blade unblocks the first portion of the aperture;
and
d) an apertured top cover that is coupled to the baseplate through a spacer that defines a gap for shutter blade movement, wherein the gap lies between the top cover and the baseplate and extends parallel to the plane.

13. A method for controlling a shutter for a light aperture comprising:
a) defining an aperture through a baseplate, wherein the aperture lies in a plane and wherein the baseplate has first and second tabs that extend outward from the plane;
b) forming a retainer that defines a planar translation path along the baseplate, wherein the translation path is parallel to the plane;
c) coupling a solenoid to the first tab of the baseplate, wherein the solenoid has a magnetic shaft that is alternately actuable, according to an electrical signal, to move to either a first position or a second position between the first and second tabs;
and
d) coupling a shutter blade to the magnetic shaft, wherein the shutter blade translates along the translation path and blocks the aperture when the magnetic shaft is in the first position and unblocks at least a portion of the aperture when the magnetic shaft is in the second position.

14. The method of claim 13 wherein coupling the shutter blade to the magnetic shaft further comprises forming a shutter blade tab that extends substantially orthogonal to the gap.

15. The method of claim 13 wherein forming the retainer comprises coupling a cover to a portion of the baseplate wherein the cover and baseplate are spaced apart to define a gap for the translation path extending between a portion of the cover and the baseplate.

16. The method of claim 13 wherein forming the retainer comprises folding a portion of the baseplate back to extend over an edge of the shutter blade.

* * * * *